United States Patent
Frederiksen et al.

(10) Patent No.: US 12,425,960 B2
(45) Date of Patent: Sep. 23, 2025

(54) USE OF CELL SWITCH ASSISTANCE INFORMATION FOR SSB SEARCHING DURING SATELLITE SWITCHING

(71) Applicant: Nokia Technologies Oy, Espoo (FI)

(72) Inventors: Frank Frederiksen, Aalborg (DK); Jeroen Wigard, Aalborg (DK); Enric Juan, Aalborg (DK); Jedrzej Stanczak, Wroclaw (PL)

(73) Assignee: NOKIA TECHNOLOGIES OY, Espoo (FI)

( * ) Notice: Subject to any disclaimer, the term of this patent is extended or adjusted under 35 U.S.C. 154(b) by 0 days.

(21) Appl. No.: 18/911,594

(22) Filed: Oct. 10, 2024

(65) Prior Publication Data

US 2025/0048249 A1     Feb. 6, 2025

Related U.S. Application Data

(63) Continuation of application No. 18/776,088, filed on Jul. 17, 2024.

(30) Foreign Application Priority Data

Aug. 4, 2023 (GB) ........................ 2311962

(51) Int. Cl.
   *H04W 48/20*     (2009.01)
   *H04W 84/06*     (2009.01)
(52) U.S. Cl.
   CPC ............ *H04W 48/20* (2013.01); *H04W 84/06* (2013.01)
(58) Field of Classification Search
   None
   See application file for complete search history.

(56) References Cited

U.S. PATENT DOCUMENTS 11,218,960 B2 *   1/2022   Myhre .............. H04W 52/0206
2020/0046498 A1   2/2020   Longoria et al.
(Continued)

FOREIGN PATENT DOCUMENTS

CN    114175715 A     3/2022
EP    4429337 A1 *   9/2024   ............ H04W 24/02
(Continued)

OTHER PUBLICATIONS

"Solutions for NR to support non-terrestrial networks (NTN)", 3GPP TSG RAN meeting #88e, RP-201256, Agenda: 9.10.6, Thales, Jun. 29-Jul. 3, 2020, 10 pages.
(Continued)

*Primary Examiner* — Hong S Cho
(74) *Attorney, Agent, or Firm* — ALSTON & BIRD LLP

(57) ABSTRACT

A UE, connected using a current cell served by a first satellite to a BS, receives information from the BS including assistance information for a cell switch from the current cell to a cell served by a second satellite. The information is received before a stop time indicating when the current cell will stop serving the UE. The UE performs the cell switch from the current cell to the cell served by the second satellite using at least the assistance information to find cell synchronization block(s) for the served by the second satellite. The BS sends the information from the BS including the assistance information for a cell switch from the current cell to a cell served by a second satellite. The BS shuts down the current cell at a stop time.

31 Claims, 7 Drawing Sheets

(56) References Cited

U.S. PATENT DOCUMENTS

| | | | |
|---|---|---|---|
| 2022/0286948 A1* | 9/2022 | Luo | H04W 48/16 |
| 2022/0353714 A1* | 11/2022 | Fu | H04W 56/0015 |
| 2022/0386259 A1* | 12/2022 | Chen | H04B 7/18563 |
| 2024/0031886 A1* | 1/2024 | Li | H04W 36/0085 |
| 2024/0048227 A1 | 2/2024 | Leng et al. | |

FOREIGN PATENT DOCUMENTS

| | | |
|---|---|---|
| GB | 2628821 A | 10/2024 |
| WO | 2020/006754 A1 | 1/2020 |
| WO | 2023/135573 A1 | 7/2023 |
| WO | 2023/211833 A1 | 11/2023 |

OTHER PUBLICATIONS

""Unchanged PCI" solution vs "PCI change only" solution", 3GPP TSG-RAN WG2 Meeting #122, R2-2306517, Agenda: 7.7.4.2, Sequans Communications, May 22-26, 2023, 5 pages.

"LS on unchanged PCI", 3GPP TSG RAN WG1 #113, R1-2304323, RAN2, May 22-26, 2023, 1 page.

"Reply LS to RAN2 on unchanged PCI", 3GPP TSG RAN WG1 #113, R1-2306210, RAN1, May 22-26, 2023, 1 page.

"3rd Generation Partnership Project; Technical Specification Group Radio Access Network; NR; Physical channels and modulation (Release 17)", 3GPP TS 38.211, V17.5.0, Jun. 2023, pp. 1-136.

"3rd Generation Partnership Project; Technical Specification Group Radio Access Network; NR; Radio Resource Control (RRC) protocol specification (Release 17)", 3GPP TS 38.331, V17.5.0, Jun. 2023, pp. 1-1328.

Search Report received for corresponding United Kingdom Patent Application No. 2311962.1, dated Feb. 1, 2024, 4 pages.

"Satellite switching without PCI change", 3GPP RAN WG2 Meeting #122, R2-2305937, Agenda: 7.7.4.2, InterDigital, May 22-25, 2023, 3 pages.

"NTN mobility enhancements for RRC_Connected", 3GPP RAN WG2 Meeting #121bis-e, R2-2303730, Agenda: 7.7.4.2, InterDigital, Apr. 17-26, 2023, 5 pages.

International Search Report and Written Opinion received for corresponding Patent Cooperation Treaty Application No. PCT/IB2024/056938, dated Nov. 22, 2024, 12 pages.

"Discussion on RAN2 LS on unchanged PCI", 3GPP TSG RAN WG1 #113, R1-2305075, Agenda: 5, CMCC, May 22-26, 2023, 5 Pages.

Intention to Grant for United Kingdom Application No. GB2311962.1 dated Jun. 18, 2025, 2 pages.

Office Action for Taiwanese Application No. 113128778 dated May 21, 2025, 45 pages.

* cited by examiner

US 12,425,960 B2

USE OF CELL SWITCH ASSISTANCE INFORMATION FOR SSB SEARCHING DURING SATELLITE SWITCHING

RELATED APPLICATIONS

This application is a 37 C.F.R. § 1.53 (b) continuation of co-pending U.S. patent application Ser. No. 18/776,088 filed on Jul. 17, 2024, which claims priority to GB Application No. 2311962.1 filed on Aug. 4, 2023, which is incorporated herein by reference in its entirety.

TECHNICAL FIELD

Examples of embodiments herein relate generally to wireless communications and, more specifically, relate to switching by User Equipment (UEs) between satellites.

BACKGROUND

A User Equipment (UE) is a wireless, typically mobile device that connects to a cellular network. Modern cellular networks can use satellites to communicate with the UE. Some satellites move relative to the earth and can create a cell in a geographical area on the earth, through which the UE can connect to the cellular network. As a satellite moves away from the geographical area, at some point, the satellite will no longer be able to form the cell in the geographical area. Another satellite, e.g., moving in the same direction as the first satellite, can also form the same cell in the same geographical area.

As the first satellite moves away and the second satellite takes its place to form the cell, the UE switches between the cell served by the first satellite and the cell served by the second satellite. This switching between cells can be problematic.

BRIEF SUMMARY

This section is intended to include examples and is not intended to be limiting.

In an exemplary embodiment, a method is disclosed that includes receiving, by a user equipment connected using a current cell served by a first satellite to a base station, information from the base station comprising assistance information for a cell switch from the current cell to a cell served by a second satellite, wherein the information is received before a stop time indicating when the current cell will stop serving the user equipment; and performing, by the user equipment, the cell switch from the current cell to the cell served by the second satellite using at least the assistance information to find one or more cell synchronization blocks for the served by the second satellite.

An additional exemplary embodiment includes a computer program, comprising instructions for performing the method of the previous paragraph, when the computer program is run on an apparatus. The computer program according to this paragraph, wherein the computer program is a computer program product comprising a computer-readable medium bearing the instructions embodied therein for use with the apparatus. Another example is the computer program according to this paragraph, wherein the program is directly loadable into an internal memory of the apparatus.

An exemplary apparatus includes one or more processors and one or more memories storing instructions that, when executed by the one or more processors, cause the apparatus at least to perform: receiving, by a user equipment connected using a current cell served by a first satellite to a base station, information from the base station comprising assistance information for a cell switch from the current cell to a cell served by a second satellite, wherein the information is received before a stop time indicating when the current cell will stop serving the user equipment; and performing, by the user equipment, the cell switch from the current cell to the cell served by the second satellite using at least the assistance information to find one or more cell synchronization blocks for the served by the second satellite.

An exemplary computer program product includes a computer-readable storage medium bearing instructions that, when executed by an apparatus, cause the apparatus to perform at least the following: receiving, by a user equipment connected using a current cell served by a first satellite to a base station, information from the base station comprising assistance information for a cell switch from the current cell to a cell served by a second satellite, wherein the information is received before a stop time indicating when the current cell will stop serving the user equipment; and performing, by the user equipment, the cell switch from the current cell to the cell served by the second satellite using at least the assistance information to find one or more cell synchronization blocks for the served by the second satellite.

In another exemplary embodiment, an apparatus comprises means for performing: receiving, by a user equipment connected using a current cell served by a first satellite to a base station, information from the base station comprising assistance information for a cell switch from the current cell to a cell served by a second satellite, wherein the information is received before a stop time indicating when the current cell will stop serving the user equipment; and performing, by the user equipment, the cell switch from the current cell to the cell served by the second satellite using at least the assistance information to find one or more cell synchronization blocks for the served by the second satellite.

In an exemplary embodiment, a method is disclosed that includes sending, by a base station to a user equipment connected using a current cell served by a first satellite to the base station, information from the base station comprising assistance information for a cell switch from the current cell to a cell served by a second satellite; and shutting down, by the base station, the current cell at a current location at a stop time.

An additional exemplary embodiment includes a computer program, comprising instructions for performing the method of the previous paragraph, when the computer program is run on an apparatus. The computer program according to this paragraph, wherein the computer program is a computer program product comprising a computer-readable medium bearing the instructions embodied therein for use with the apparatus. Another example is the computer program according to this paragraph, wherein the program is directly loadable into an internal memory of the apparatus.

An exemplary apparatus includes one or more processors and one or more memories storing instructions that, when executed by the one or more processors, cause the apparatus at least to perform: sending, by a base station to a user equipment connected using a current cell served by a first satellite to the base station, information from the base station comprising assistance information for a cell switch from the current cell to a cell served by a second satellite; and shutting down, by the base station, the current cell at a current location at a stop time.

An exemplary computer program product includes a computer-readable storage medium bearing instructions that, when executed by an apparatus, cause the apparatus to perform at least the following: sending, by a base station to a user equipment connected using a current cell served by a first satellite to the base station, information from the base station comprising assistance information for a cell switch from the current cell to a cell served by a second satellite; and shutting down, by the base station, the current cell at a current location at a stop time.

In another exemplary embodiment, an apparatus comprises means for performing: sending, by a base station to a user equipment connected using a current cell served by a first satellite to the base station, information from the base station comprising assistance information for a cell switch from the current cell to a cell served by a second satellite; and shutting down, by the base station, the current cell at a current location at a stop time.

DETAILED DESCRIPTION OF THE DRAWINGS

Figure 1A:
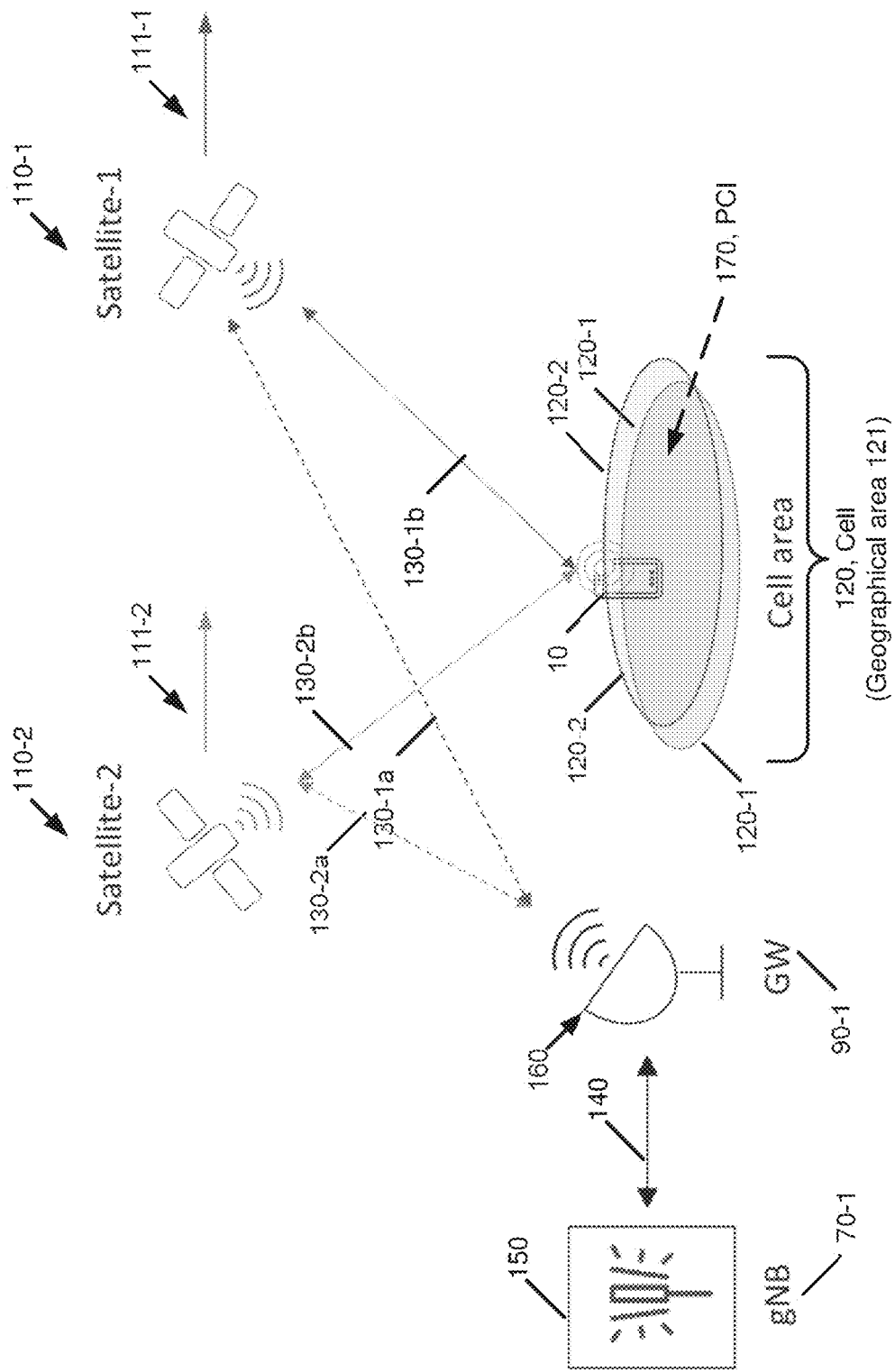
FIG. 1A illustrates quasi-earth fixed cell changing during satellite switching for a single gNB on earth.

Abbreviations that may be found in the specification and/or the drawing figures are defined below, at the end of the detailed description section.

The word "exemplary" is used herein to mean "serving as an example, instance, or illustration." Any embodiment described herein as "exemplary" is not necessarily to be construed as preferred or advantageous over other embodiments. All of the embodiments described in this Detailed Description are exemplary embodiments provided to enable persons skilled in the art to make or use the invention and not to limit the scope of the invention which is defined by the claims.

When more than one drawing reference numeral, word, or acronym is used within this description with "/", and in general as used within this description, the "/" may be interpreted as "or", "and", or "both". As used herein, "at least one of the following: <a list of two or more elements>" and "at least one of <a list of two or more elements>" and similar wording, where the list of two or more elements are joined by "and" or "or," mean at least any one of the elements, or at least any two or more of the elements, or at least all the elements.

As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components etc., but do not preclude the presence or addition of one or more other features, elements, components and/or combinations thereof.

Any flow diagram (see FIG. 2 or 3) or signaling diagram herein is considered to be a logic flow diagram, and illustrates the operation of an exemplary method, results of execution of computer program instructions embodied on a computer readable memory, functions performed by logic implemented in hardware, and/or interconnected means for performing functions in accordance with an exemplary embodiment. Block diagrams (such as FIGS. 1A, 1B, 1C, 4) also illustrate the operation of an exemplary method, results of execution of computer program instructions embodied on a computer readable memory, functions performed by logic implemented in hardware, and/or interconnected means for performing functions in accordance with an exemplary embodiment.

Non-terrestrial communications can be in a complementary manner to terrestrial deployments, where satellite connectivity can provide coverage beyond terrestrial deployments. 3GPP has defined and completed a work item for Rel-17 on non-terrestrial networks (NTN) in RP-201256 (see RP-201256, Thales, "Solutions for NR to support non-terrestrial networks (NTN)", 3GPP TSG RAN meeting #88e, e-meeting, Jun. 29-Jul. 3, 2020) and a work item for Rel-18 on NTN performance enhancements.

One of the objectives for Rel-18 NR NTN is to continue enhancements for both NTN-NTN and NTN-TN mobility and service continuity. The work will consider existing methods from NR TN and Rel-17 NR NTN as baseline for further enhancements including the following:

"Specify NTN-NTN handover enhancement for RRC_CONNECTED UEs in the quasi-earth-fixed cell and earth-moving cell to reduce the signaling overhead. [RAN2, RAN3]."

In previous RAN2 meetings, there were some discussions about handover enhancements and some agreements related to unchanged PCI solution were achieved as follows (shown between opening and closing quotation marks):

"Agreements:
  2. New Proposal 2: RAN2 continues the discussion (e.g. at RAN2 #120) on the solution with keeping the same PCI after switching of the satellites. Clarify at least the following:
  RAN1 impact
  The need to perform UL beam switching and/or RA
  Applicability to hard or soft satellite switching
Working Assumption:
  1. In quasi-earth fixed cell case, for hard satellite switch in the same SSB frequency and same gNB (no key change), satellite switching without PCI changing (not requiring L3 mobility) is supported.
Agreements:
  1. In quasi-earth fixed cell case, for hard satellite switch in the same SSB frequency and same gNB (no key change), satellite switching without PCI changing (not requiring L3 mobility) is supported, unless major technical issues are identified by RAN1 (as usual RAN2 will aim at minimizing the specification impact so that it fits in Rel-18)"

In Rel-17 NTN, cells originating from different satellites are associated with different PCIs. A stationary UE will thus experience continuous L3 mobility as the serving satellite moves out of coverage and a new satellite takes over coverage of the geographic area. The unchanged PCI technique was introduced to avoid the need for L3 mobility, which can reduce signaling overhead considering the large number of UEs served within an NTN cell. It is noted that the examples herein may work with the unchanged PCI techniques or changed PCI techniques.

Turning to FIG. 1A, this figure illustrates a quasi-earth fixed cell 120 changing during satellite switching for a single gNB on earth. Satellites 1 110-1 and 2 110-2 are moving as per corresponding directions 111-1 and 111-2, which means satellite 1 110-1 is moving out of range of the cell 120 so that satellite 2 110-2 will take over the cell 120. That is, the UE 10 will be switched from satellite 1 110-1 to satellite 2 110-2.

The satellite 1 110-1 communicates with the GW 90-1 and gNB 70-1 via the satellite dish 160 and link 140, where the gNB 70-1 uses antenna 150. The link 140 may be wired or wireless. The satellite 1 110-1 in this example acts as a repeater, and there is a path 130-1 from the GW 90-1 with the UE 10. That is, the satellite 1 110-1 repeats communications on link 130-1a to or from the UE 10 via link 130-1b, and the path 130-1 comprises both links 130-1a and 130-1b. Similarly, the satellite 2 110-2 communicates with the GW 90-1 and gNB 70-1 via the satellite dish 160 and link 140. The satellite 2 110-2 in this example acts as a repeater, and there is a path 130-2 from the GW 90-1 with the UE 10. That is, the satellite 2 110-2 repeats communications on link 130-2a to or from the UE 10 via link 130-2b, and the path 130-2 comprises both links 130-2a and 130-2b.

The cell 120 corresponds to a geographical area 121. Although one "cell" 120 is illustrated, slight differences in cell location are shown: cell 120-1 is an "old" (or current) cell formed by satellite 1 110-1; and cell 120-2 is a "new" formed by satellite 2 110-2.

As shown in FIG. 1A, for the quasi-earth fixed cell scenario, should an unchanged PCI concept be used, this relies on a geographic area 121 which is associated with a PCI 170 and gNB 70-1. There, a gNB 70-1 could provide service to the same coverage area while connecting to different satellites 110-1, 110-2 and PCI 170 is kept unchanged after satellite switching. Since the PCI 170 and the serving gNB 70-1 configuration remains the same, the satellite switch may be mostly transparent to the UE(s) 10.

The following steps will take place during the satellite switching (see FIG. 1A):
1. The UE 10, which is stationary or moving, is being served by satellite-1 110-1.
2. As satellite-1 110-1 moves away from the UE 10 and satellite-2 110-2 gets closer, the gNB 70-1 (routing the serving cell 120-1 through satellite-1 110-1) may indicate when satellite-1 110-1 will be switched off, when satellite-2 110-2 will become available and how to perform re-synchronization to the new cell.
3. Once satellite-2 110-2 takes over (cell 120-2, which takes over from cell 120-1), the UE performs DL/UL synchronization operations to resume TX/RX.

As mentioned before, even though the UE 10 is being served by a new satellite, the UE does not change the serving gNB, so the UE can keep the cell configuration. Satellite-1 110-1 and satellite-2 110-2 are configured with the same PCI 170 (in this example), same UE context, and same protocol stack (including, e.g., SSB generation, coding/decoding, modulation/demodulation, same CORESET configuration, and switch routing). However, from the UE's reference, satellite-1 110-1 and satellite-2 110-2 introduce different frequency (i.e., Doppler) and timing drifts. Note that no specific agreements on how UE and NW should behave in case of satellite switching have been made as part of the 3GPP discussions yet.

The conditions for the unchanged PCI mechanism to work include the following:
a) NTN cells must be deployed as quasi-Earth fixed cells (EFCs) since the cell coverage's area should not change;
b) The network (NW) should indicate to the UE how/when to perform DL and UL synchronization after satellite switching; and
c) The network would accept an interruption gap for the UE to detect the new timing and adapt to this. The network needs to have means to avoid radio link failure (RLF) during this interruption gap (i.e. after the "old"/"current" cell disappears and before the "new" cell takes over).

In Rel-18, the focus is on transparent architecture and the most obvious case is when the cells are provided by the same gNB, i.e., the same cell with the fixed PCI is provided by the same gNB, so only the satellite node changes. However, theoretically, this could also work with different gNBs and potentially even for the regenerative case.

Figure 1B:
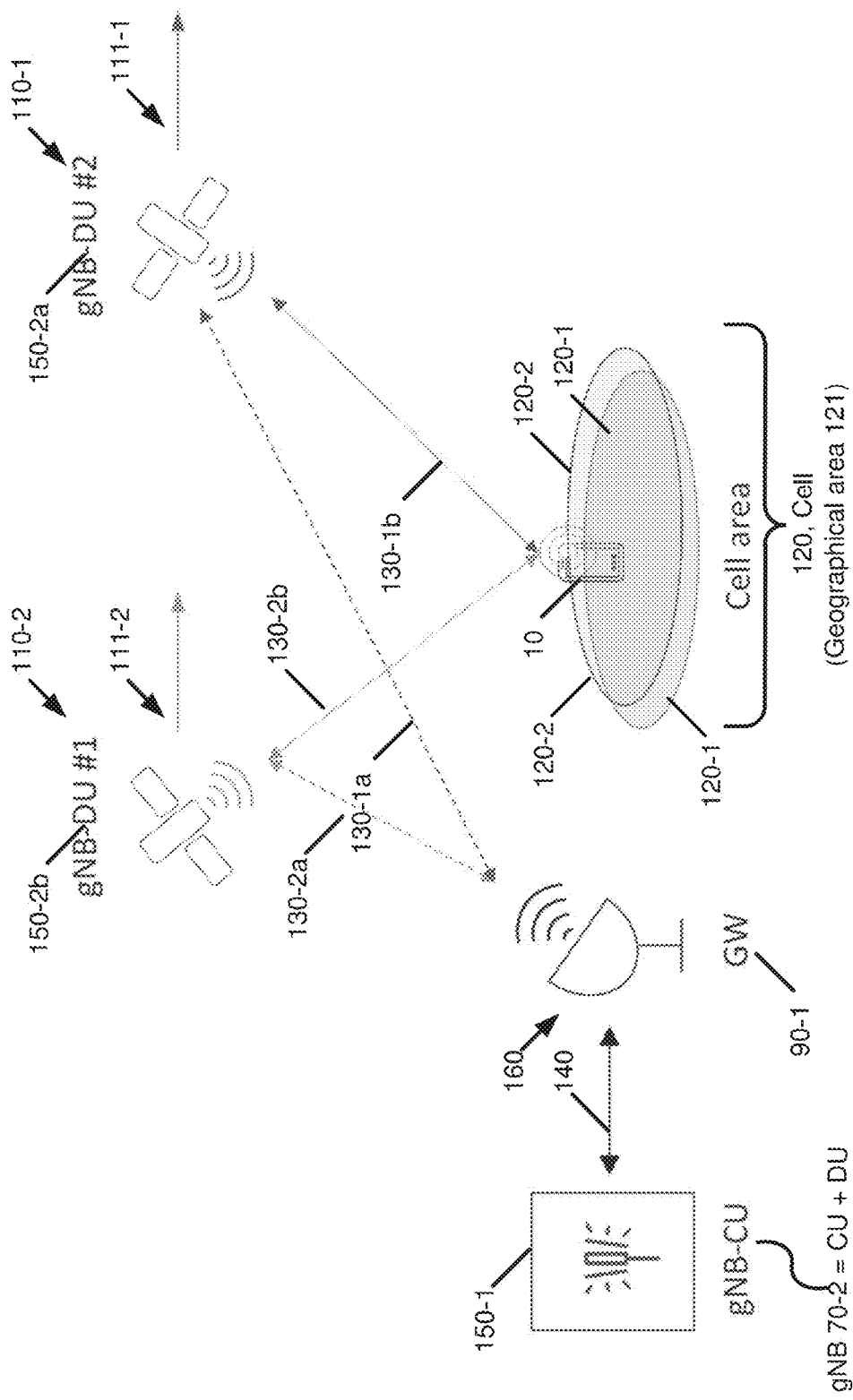
FIG. 1B illustrates quasi-earth fixed cell changing during satellite switching for a gNB having a CU on earth and individual DUs on the satellites.

That is, in addition to the structure in FIG. 1A, where the gNB 70 is on earth, other structures are possible. Turning to FIG. 1B, this figure illustrates quasi-earth fixed cell changing during satellite switching for a gNB having a CU on earth and individual DUs on the satellites. In the example of FIG. 1B, the gNB 70-2 is split into a central unit (CU) 150-1 on earth and individual distributed units (DUs): DU 150-2a on satellite 1 110-1; and DU 150-2b on satellite 2 110-2. This example requires additional coordination (relative to the structure in FIG. 1A) between the gNB-CU 150-1 and the gNB-DUs 150-2a and 150-2b, since there is communication between CU and DU to set up coordination.

Figure 1C:
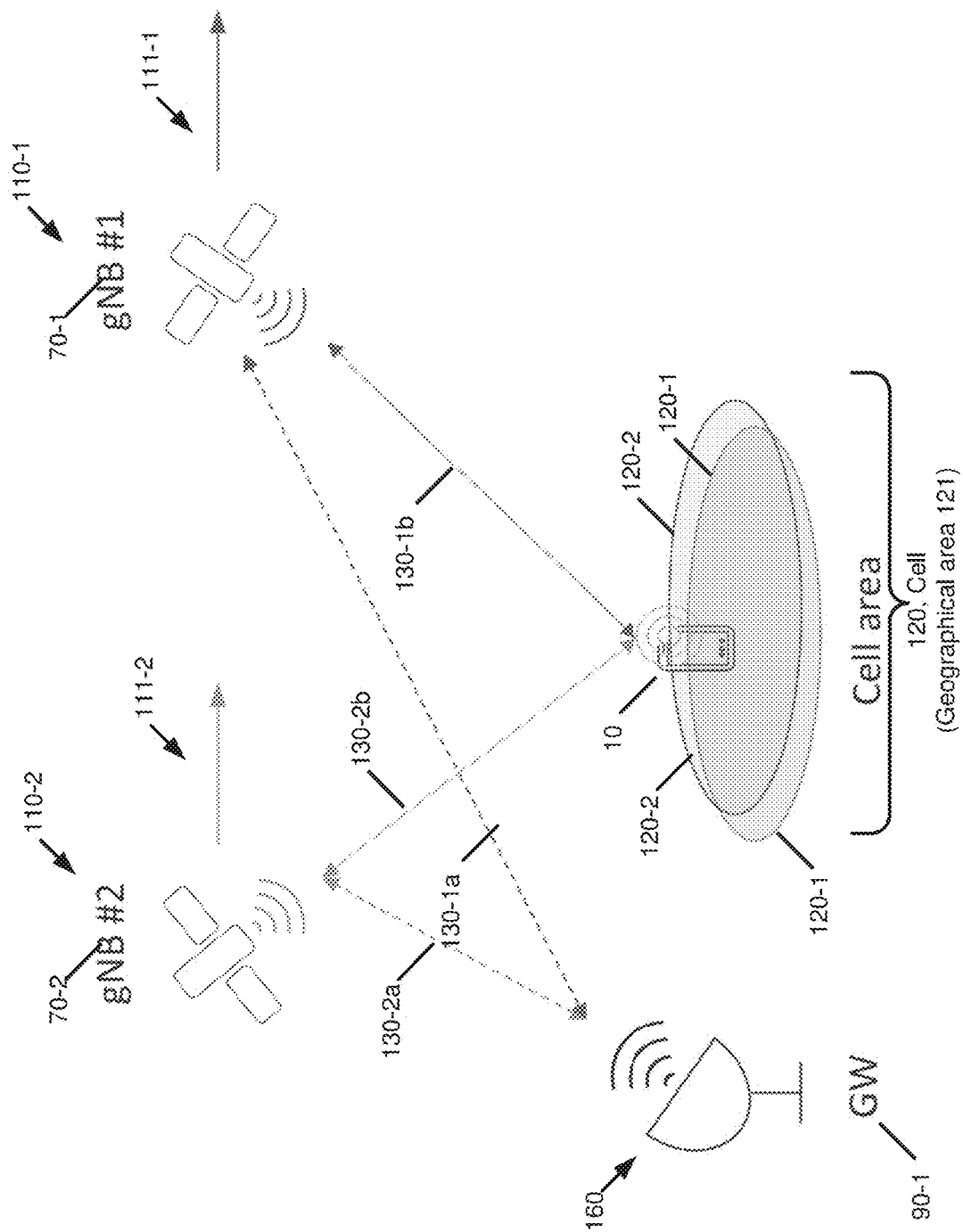
FIG. 1C illustrates quasi-earth fixed cell changing during satellite switching for individual gNBs on the satellites.

FIG. 1C illustrates another possibility of quasi-earth fixed cell changing during satellite switching for individual gNBs on the satellites. This example has the gNBs 70 being implemented on the satellites: gNB #1 70-1 is implemented on satellite 1 110-2; and gNB #2 70-2 is implemented on satellite 2 110-2. In this scenario, a relatively high degree of coordination among gNBs would be necessary, as compared to the coordination needed in FIG. 1B. FIG. 1C illustrates the regenerative case, where the satellites 110 regenerate the information being transmitted by the GW 90-1.

In addition, the similar concept for changed PCI as unchanged PCI was discussed in R2-2306517 (see R2-2306517, Sequans Communications, "'Unchanged PCI' solution vs 'PCI change only' solution", 3GPP TSG-RAN WG2 Meeting #122, Inchcon, South Korea, 22-26 May 2023), which can solve the issue of the unchanged PCI that it will not be supported by Rel. 17 terminals. Therefore, some of the issues in unchanged PCI may exist for changed PCI. That is, the changed PCI technique is a compromised technique to avoid impacting Rel-17 UEs. The working principle is the same (no L3 mobility), but the new cell should use a different PCI.

As previously stated, the examples herein are valid for both cases of changed PCI or unchanged PCI. That is, regardless of the PCI changing or not, the UE still requires certain assistance information to know when/how to perform the cell switching, and the examples herein may provide that assistance information.

The followings agreements have been made during RAN2 #121-bis-e meetings and RAN2 #122 meeting for the unchanged PCI topic.

In meetings RAN2 #121-bis-e and RAN2 #122, the following agreements were made for the topic (both are between opening and closing quotes):

"Agreements in RAN2 #121-bis-e
1. In quasi-earth fixed cell case, for hard satellite switch in the same SSB frequency and same gNB (no key change), satellite switching without PCI changing (not requiring L3 mobility) is supported, unless major technical issues are identified by RAN1 (as usual RAN2 will aim at minimizing the specification impact so that it fits in Rel-18)
2. Remove the part in brackets "as usual RAN2 will aim at minimizing the specification impact so that it fits in Rel-18" in the LS to RAN1. The action to RAN1 will also ask for feedback for the hard satellite switch (not only the soft satellite switch case), e.g., action to RAN1 is to see if there are any major technical issues (as in the agreement)."

"Agreements in RAN2 #122 t-Service in SIB 19 can also be interpreted by Rel-18 UE in Connected mode to know that a satellite change or feeder link change happens.

In hard switch unchanged PCI scenario (i.e. no handover), the UE needs to know the time the UE attempts to re-synchronize. (FFS whether a new "t-Start"/a t-gap is needed or whether t-Service can be reused (i.e. no other IE) if the gap is very short/zero)."

This means that at least hard satellite switching with unchanged PCI and without L3 mobility was agreed to be supported. However, no explicit details have been decided so far. Further, In RAN1 #113, the following LS (R1-2304323, "LS on unchanged PCI", 3GPP TSG RAN WG1 #113, Incheon, Korea, May 22-May 26, 2023) was addressed (this is between opening and closing quotes):

"For mobility enhancement in Rel-18 NR NTN, in quasi-earth fixed cell case, RAN2 has discussed unchanged PCI scenario, including hard satellite switching (non-overlapping satellite coverage at switching time) and soft satellite switching (overlapping satellite coverage at switching time).

RAN2 has agreed that, in quasi-earth fixed cell case, for hard satellite switch in the same SSB frequency and same gNB (no key change), satellite switching without PCI changing (not requiring L3 mobility) is supported, unless major technical issues are identified by RAN1. RAN2 understands that the standard impact includes that the UE may be notified to re-acquire DL/UL synchronization with the serving cell after the satellite switching.

RAN2 understands that the feasibility of soft satellite switching without PCI change (not requiring L3 mobility) is more relevant to RAN1 aspects, and would like to check its feasibility with RAN1.

ACTION: RAN2 kindly requests RAN1 to take into account the above agreement on hard satellite switching without PCI change and provide feedback if RAN1 identifies any major technical issues, and also provide feedback on the feasibility to support soft satellite switching without PCI change."

During RAN1 #113 the topic was discussed briefly and RAN1 provided an LS response to RAN2 in R1-2306210 which has the following information (mainly addressing the hard switch) (with this section between opening and closing quotation marks):

"Question 1: For hard satellite switching without PCI change, if RAN1 identifies any major technical issues?
Reply:
RAN1 discussed the resynchronization of UE when hard switching, given that new common TA, K_mac, ephemeris and cell-specific K-offset are applied during resynchronization to new satellite.

From RAN1 perspective, no feasibility issue is identified for hard satellite switching without PCI change."

During the RAN1 discussions for the LS response there was no consensus on responding on the soft satellite switch. Such discussions are expected to continue at RAN1 #114 in August of 2023.

In the unchanged PCI scenario, the satellite switching occurs transparently to the UE. That means that the UE switches from source satellite access node to a target satellite access node without performing L3 mobility and without changing the serving gNB.

Under the soft satellite switching scenario, the intention is that the same geographical area would be served by two satellites at the same time, possibly with the same physical cell ID (PCI 170). Another possibility is that the inbound satellite's cell will become available before the outbound satellite's cell switches off. As it is understood therefore, the intention is that the two cells (e.g., created with the same PCI) would need to be, at the same time, non-separable by the UE (to create the illusion of being in the "same cell served by the same gNB"), while at the same time allowing the UE to perform a "switch-over" in a controlled manner.

At the RAN1 #113 meeting, there was nothing concrete with respect to how the soft satellite switch was intended to work, e.g., telling the UE to re-synchronize to its current PCI (i.e., current serving cell) would not guarantee that the UE finds a set of SSBs that are different from the current. When performing the soft switch from "old cell" to "new cell", the UE as part of the "resynchronization" would have same probability of finding the old cell as finding the new cell (with same PCI). While attempting to access the new cell, the UE risks:

a) Finding the "old cell" (i.e., same SSB location), which means that the UE would attempt to re-synchronize to the outbound satellite. This might lead the UE into RLF and legacy RRC re-establishment, which increases the UE's power consumption, reduces the system's capacity, and degrades the user's experience.
b) Searching for a long time for the "new cell" (i.e., SSB from same serving gNB but at a different location).
c) Even when finding the new cell, the UE needs to know which SSB belongs to the old and which SSB belongs to the new cell, as for instance the satellite assistance information is different.

The examples herein address these and other issues. In one example herein, it is proposed to provide "cell switch assistance" information that allows a UE to perform "guided search" towards the same cell PCI (the unchanged PCI scenario) when the UE 10 is requested to resynchronize to the cell 120 as part of NTN operation. The cell switching should occur without L3 mobility (i.e., no handover) and the UE should re-synchronize only to the cell routed through the incoming satellite. The same "guided search" may also be applied to the changed PCI scenario, where the PCI for old and new cells are different.

More specifically, the soft cell switch assistance information (also referred to as assistance information for a soft cell switch) may include a set of one or more of the following elements:

1) A time offset relative to the existing cell timing (i.e., UE being indicated to search, after 'X' slots offset, for a new SSBs). Such offset could use, as a reference, the first OFDM symbol from the last SSB reading. Alternatively, the indication could include the absolute time when the UE should start measuring.
2) A frequency offset of the SSBs to use for the synchronization (either indicated as absolute offset or as relative offset to the existing Point A (also, "PointA"), described below, for the "old cell").

3) A different set of SSB locations may be provided corresponding to the new cell. This can be performed by reusing the same or similar IE as already available in 3GPP TS 38.331 (SSB-ToMeasure—potentially with an indication that the SS/PBCH block is an SSB with same PCI as current serving cell). See, e.g., 3GPP TS 38.331 V17.5.0 (2023-06). The bitmap in this IE will indicate specific SSB indices, which are provided by the outgoing satellite and incoming satellite.

4) A time interval (e.g., a window) for the UE to perform the search for a re-synchronization attempt.

5) Ephemeris information to apply when attempting a re-synchronization, which the UE can use to deduct at least the time offset, provided the timing at the gNB (or reference point) is identical.

All the information may have a timestamp, as the offsets may change (at least in time) due to the movement of the satellites. For the timestamp, there could be a single timestamp for whichever ones of (1)-(5) above are used, but each of the elements can come with a corresponding timestamp for individual elements.

Since most of the cell characteristics (i.e., cell configuration parameters) will remain the same during a configured soft switch of the serving satellite, it could be assumed that the general cell configuration (and UE specific configuration) would remain unchanged. That is, the system bandwidth, the CSI-RS configuration, the CORESET configuration, the UL BW and PUCCH configurations would remain un-altered. From system operation point of view, it would mainly be the time-frequency location of the SSBs that would change (and of course also the associated transmit timing relations caused by the change of feeder link and service link delays as well as the change of Doppler offset caused by the change of the service link-all these would be associated to the ephemeris information that is also assumed to be available for the UE before the re-synchronization attempt).

It should be noted that although the examples describe the operation under NTN (where the examples will utilize the fact that one gNB 70 may potentially serve the UE through multiple "remote radio heads"—the satellites), the examples may be expanded to also cover cases where a UE is able to autonomously determine its own position in the network as well as the gNB(s) positions. For such cases, there would in principle also be the possibility of performing a "PCI switch" without involving the L3 Handover mechanisms. Such extension to terrestrial network operation might be complex, however.

As part of the operation, the UE should recognize the frame structure as described in 3GPP TS 38.211, see, e.g., 3GPP TS 38.331 V17.5.0 (2023-06), where a central part for Point A is quoted below (between opening and closing quotations):

"Point A serves as a common reference point for resource block grids and is obtained from:
  offsetToPointA for a PCell downlink where offset-ToPointA represents the frequency offset between point A and the lowest subcarrier of the lowest resource block, which overlaps with the SS/PBCH block used by the UE for initial cell selection, expressed in units of resource blocks assuming 15 kHz subcarrier spacing for FR1 and 60 kHz subcarrier spacing for FR2;
  for operation without shared spectrum channel access in FR1 and FR2-1, the lowest resource block has the subcarrier spacing provided by the higher layer parameter subCarrierSpacingCommon;
  for operation with shared spectrum channel access in FR1 or FR2, and for operation without shared spectrum channel access in FR2-2, the lowest resource block has the subcarrier spacing same as the SS/PBCH block used by the UE for initial cell selection;
  absoluteFrequencyPointA for all other cases where absoluteFrequencyPointA represents the frequency-location of point A expressed as in ARFCN."

As can be seen, the PointA is being described as an offset from the SSB to the lower PRB of the system bandwidth. For the described situation above, the timing offsets relative to the existing SSB structure would be relatively trivial, while the modifications to the PointA offset would potentially need some additional consideration.

As suggested under the examples, it is possible that the UE 10 is configured with an additional value (e.g., delta-offsetToPointA) to apply during the re-synchronization such that it is ensured that a UE that is performing such operation would not be finding a "current SSB" since the "new SSB" is located on another set of subcarriers. The intention with delta-offsetToPointA is that the new SSB is located at a different frequency (as compared to the location of the current SSB) in the overall bandwidth system. Time offset could be optional but some orthogonality via the frequency domain is useful.

The details presented above are now described through an example. This example uses part of FIG. 1A and also FIG. 2, which is a flowchart of a method performed by a UE for use of cell offset information for SSB searching during satellite switching. In the example of FIG. 1A, the UE 10 is currently connected to satellite 1 110 as its "old" (e.g., current) satellite. This satellite 1 110-1 is also an outbound satellite, as it is moving away (per direction 111-1) from the cell 120. Meanwhile, satellite 2 110-2 is an inbound satellite (via direction 111-2) that will take over formation of cell 120. Both satellites 110-1 and 110-2 therefore form the cell 120 to which the UE 10 is or will be connected.

Outbound and incoming satellites will route the same cell 120 (coming from the same gNB 70-1). That means that for the soft satellite switch, during an overlapping period (when both satellites 110 form the same cell 120), the UE 10 is connected to the serving cell 120-1 (formed by the outbound satellite 110-1) and needs to re-sync to the incoming satellite 110-2 and its corresponding cell 120-2. Since it is the same cell configuration for both satellites, the SSB time and frequency location will be same for both too. The UE requires assistance information so it can know "where" to search/measure the new cell. Otherwise, the risk is that the UE measures again the SSB from the current (e.g., old) cell 120-1 and re-syncs (re-synchronizes) to the outbound satellite 110-1.

In preparation for the soft cell (e.g., and satellite) switch, and prior to the same, the gNB 70-1 sends soft cell switch assistance information 230, which is received by the UE 10 in block 205 of FIG. 1A. The soft cell switch assistance information 230 is shown as 230-1 through 230-5, and is described below. Furthermore, the UE 10 can determine, in block 203, a stop time, which indicates when the current (e.g., serving) cell will stop serving the UE. Block 205 is therefore performed before the stop time. The stop time can be determined by an explicit signaling and corresponding reception of an indication of a stop time, or be determined using, e.g., the t-Service, or t-Start, or t-Gap described below. In other words, the UE 10 can determine a time when the current cell will stop serving the UE, and this determined time is the stop time.

In block 210, the UE 10 uses the "old" (current, e.g., serving) cell 120-1 (from the outbound satellite 110-1). In block 215, the UE 10 determines whether a soft satellite switch to the "new" cell 120-3 (formed by the second, inbound, satellite) is to be performed. The UE can determine when to perform the switch in a variety of ways. In RAN2 #122, it was agreed that the UE can interpret t-Service to know that a satellite switch will occur (but nothing more specific was agreed). However, there are ongoing discussions about the gNB indicating when the new cell will become available (t-Start) or how long the overlapping period (also referred to as an interruption gap) could be (t-Gap). That is, the stop time determined in block 203 may be determined using these or via other techniques. Regardless of what is actually used, the UE 10 can determine in block 215 whether or not a soft satellite switch to the "new" cell 120-3 is to be performed. If not (block 215=No), the UE uses the old cell. If so (block 215=Yes), the UE performs (reference 218) the cell switch, which includes blocks 220 and 225. It is noted that the cell 120 may be formed by the satellite 110 or by the BS, e.g., gNB 70, in this case the satellite 110 only relays the signals. Therefore, the term "served" is used herein to indicate what the cell 120 is formed by the satellite 110 itself or the satellite 110 relaying signals from a gNB 70.

In particular, the UE searches (block 220) for the "new" cell 120-2 synchronization block(s) from the incoming satellite 110-2. The block 220 has multiple sections 1-5, each of which corresponds to the soft cell switch assistance information 230-1 through 230-5. It is noted that the soft cell switch assistance information 230-1 through 230-5 correspond to the soft cell switch assistance information (1) to (5) that have been previously described, and this information may be described as assistance information for a soft cell switch.

In block 220-1, the UE performs a search using the soft cell switch assistance information 230-1 of the time offset(s) relative to the cell timing. The SSB can be moved in frequency and time. One idea of (1) (230-1) is to indicate a time offset, or multiple time offsets, so the UE knows at what instant or instants the UE should measure for the SSB coming from the incoming satellite.

In block 220-2, the UE performs a search using the soft cell switch assistance information 230-2 of a frequency offset. This can be considered to be a similar concept as (1) (230-2), but the offset is in the frequency domain. The UE is indicated a certain offset so the UE knows the frequency where the new SSB is located. Note that this assumes certain orthogonality between old and new SSBs. The frequency offset of the SSB(s) are used for detection, measurement, and evaluation of the SSB(s) of the cell served by the incoming (e.g., second) satellite.

As previously described, the UE 10 may be configured with an additional value (e.g., delta-offsetToPointA) to apply during the re-synchronization such that it is ensured that a UE that is performing such operation would not be finding a "current SSB" since the "new SSB" is located on another set of subcarriers. One example of block 220-2 is block 220-2i, where the UE searches using the soft cell switch assistance information 230-2i, the additional value (e.g., delta-offsetToPointA).

Figure 2:
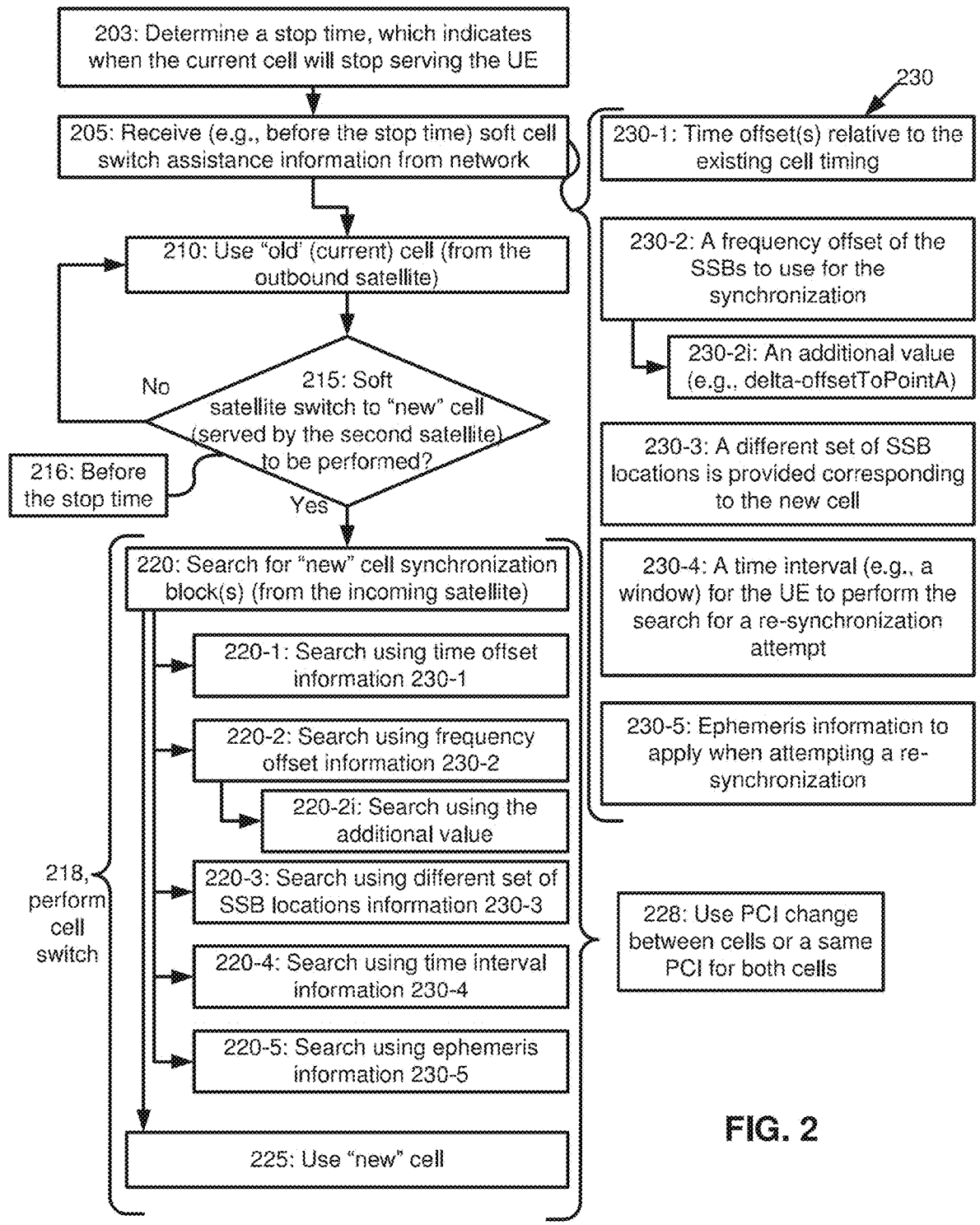
FIG. 2 is a flowchart of a method performed by a UE for use of cell offset information for SSB searching during satellite switching.
Figure 2A:
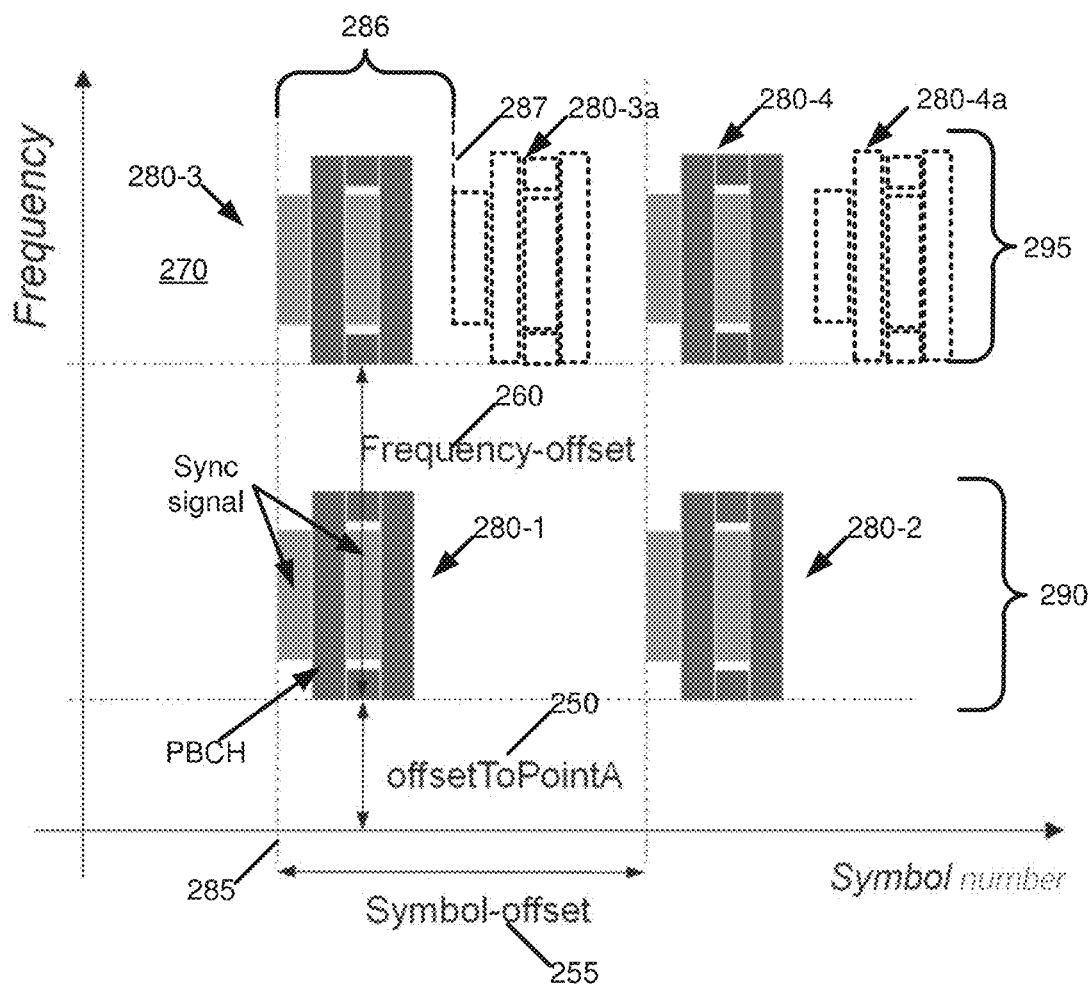
FIG. 2A illustrates an example of a resource space using frequency offset as soft cell switch assistance information.

Turning to FIG. 2A, this figure illustrates an example of a resource space 270 using frequency offset as soft cell switch assistance information. Resource space 270 is a time (in symbols, e.g., OFDM symbols) and frequency (in subcarriers) space. A symbol offset 255 in time is between cell synchronization (e.g., SS/PBCH) blocks 280-1 and 280-2 and also between cell synchronization (e.g., SS/PBCH) blocks 280-3 and 280-4. Each SS/PBCH block, as an example of a cell synchronization block 280, has sync (synchronization) signals (SSs, such as PSS, SSS) and PBCH that is a set of time-frequency resources surrounding an internal sync signal. The offsetToPointA 250 shows an offset in frequency from a lowest frequency (e.g., a lowest subcarrier of the lowest resource block) for the resource space 270 to a first subcarrier for the SS/PBCH blocks 280-1 and 280-2. The frequency-offset 260, e.g., as delta-offsetToPointA, illustrates an offset from the offsetToPointA where the first subcarrier for the SS/PBCH blocks 280-3 and 280-4 is. The SS/PBCH blocks 280 in region 290 are used for the old cell 120-1, while the SS/PBCH blocks (as cell synchronization blocks) 280 in region 295 are used for the new cell 120-2. Thus, delta-offsetToPointA (along with offsetToPointA), or another indicator of a starting subcarrier, may be used to indicate where the SS/PBCH blocks 280 in region 295 are.

The cell synchronization blocks 280 in an example are SS/PBCH blocks. The cell synchronization blocks 280 may also be referred to as SSBs, as the SSBs contain SS/PBCH blocks, and are typically not separable.

It is noted that time offsets (see block 220-1) could similarly be applied. For instance, reference 286 indicates a possible time offset from time 285 (the start of SS/PBCH block 280-1) where the starting symbol of SS/PBCH block 280-3 could be at reference 287 and indicated by SS/PBCH block 280-3a. Note that both SS/PBCH blocks 280-3 and 280-4 would be shifted to the right by the time offset indicated by reference 286 and from SS/PBCH blocks 280-3a and 280-4a.

In block 220-3 of FIG. 2, the UE performs a search using the soft cell switch assistance information 230-3 of different set of SSB locations information (e.g., in time/frequency). In more detail, as part of the SSB configuration, the UE may receive the IE SSB-ToMeasure that indicates a time/frequency pattern of SSB (e.g., possibly including indexes for consecutive SSBs, where this is more relevant for beam-based mobility management). In this case, it was intended that the UE could receive a new SSB-ToMeasure IE, so the UE can know where/when to measure the new SSB.

In block 220-4, the UE performs a search using the soft cell switch assistance information 230-4 of a time-interval for searching. This may involve a similar principle as the options above, but the UE is only indicated to search from, e.g., −T to T. In this case, the gNB 70-1 should ensure that during this time window the UE would find only the SSB routed from the incoming satellite 110-2. For the example in FIG. 2A of SS/PBCH blocks 280-3a and 280-4a, the time period of these blocks is different from and does not overlap SS/PBCH blocks 280-1 and 280-2, and would be a good candidate for blocks 220-4/230-4.

In block 220-5, the UE performs a search using the soft cell switch assistance information 230-5 of ephemeris information. One example of an issue with this satellite switch without L3 mobility is that frequency and timing drift will change from one satellite to another one. In NTN, the UE has knowledge of the satellite ephemeris and the common TA (i.e., RTT from gNB to satellite) so the UE can pre-compensate Doppler shift and timing drift due to satellite's speed. When switching from one satellite to another one, the UE might need such assistance information (provided by the ephemeris information) to estimate the new Doppler and the new RTT, so the UE can discriminate better than without this information as to when and where the new SSB is.

In block 225, the UE uses the "new" cell. It is noted (see block 228) that the cell switch may be performed using a PCI change between cells (i.e., the current and new cell use different PCIs) or a same PCI for both cells.

It is further noted that multiple ones of the options 220-1 through 220-5 may be used. For example, both blocks 220-1 and 220-2 (and 220-2i) can be used together, as the cell synchronization blocks 280 can be moved in both time (220-2) and frequency (220-2 and 220-2i). Another example is using the time interval information in 220-4 while also applying the frequency offset information in 220-2 or 220-2i. A further example is block 220-5 might be combined with any of blocks 220-1 through 220-4.

Figure 3:
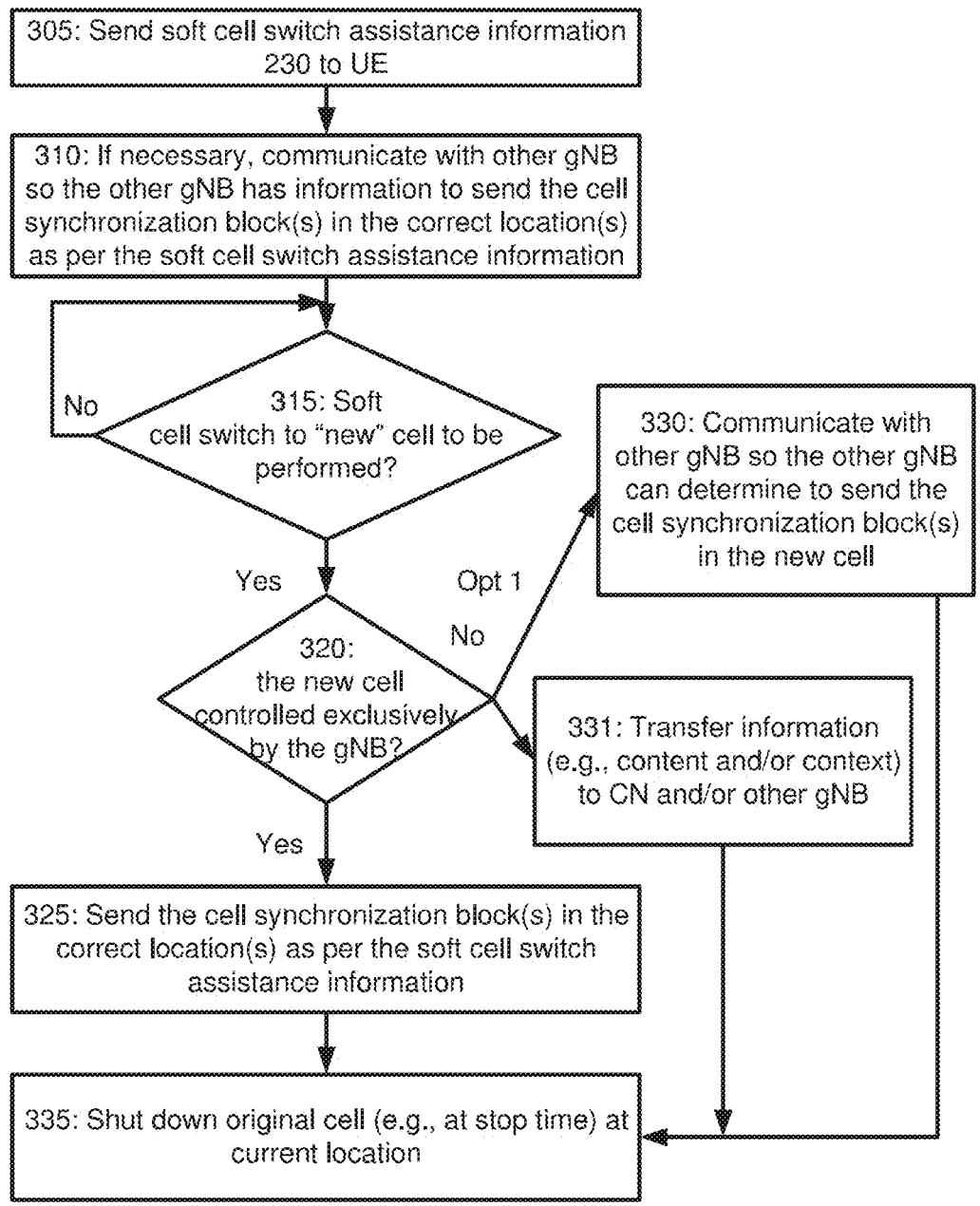
FIG. 3 is a flowchart of a method performed by a gNB for use of cell offset information for SSB searching during satellite switching.

Referring to FIG. 3, this figure is a flowchart of a method performed by a gNB for use of cell offset information for SSB searching during satellite switching. In block 305, the gNB 70 sends soft cell switch assistance information 230 to the UE 10. The gNB 70 in block 310 communicates, if necessary, communicate with another gNB so the other gNB has information to send the cell synchronization block(s) 280 in the correct location(s) as per the soft cell switch assistance information. For the transparent architecture case such as in FIG. 1A, there is generally no communication between the two satellites 110. In case of regenerative architecture such as in FIG. 1C, there could be coordination among the gNB functions on board of the satellites 110. That is, the gNB 70-1 in satellite 1 110-1 communicates information with the gNB 70-2 of satellites 2 110-1 so the gNB 70-2 sends the cell synchronization block(s) 280 in the correct location(s) as per the soft cell switch assistance information.

In block 315, the gNB 70 determines whether a soft switch to a new satellite is to be performed. If not (block 315=No), the gNB 70 waits. If a soft switch is to be performed (block 315=Yes), block 320 is performed, where the gNB 70 determines whether the new cell is controlled exclusively by the gNB. If so (block 320=Yes), the gNB 70 in block 325 sends the cell synchronization block(s) in the correct location(s) as per the soft cell switch assistance information. If not (block 320=No), the gNB 70 communicates in block 330 with the other gNB (e.g., 70-2 of FIG. 2C) so the other gNB can determine to send the cell synchronization block(s) in the new cell. Note that block 330 is one option (Opt 1), and an alternative option (block 331, Opt 2) is that a core network element can inform the other gNB of when and how to send the cell synchronization block(s) in the new cell. In this procedure, the source gNB, the target gNB, and the core network (CN) are involved, as some of the mobility and higher layer management are in the CN, while some of the content and context is transferred from the source gNB to the target gNB (can be performed through the CN or directly). It is additionally noted that the two gNBs 70 could be prepared (e.g., using gNB-to-gNB communication or communication from a core network element to both gNBs 70) beforehand with a time instance or instances indicating, e.g., when the soft cell switch is to occur. In block 335, the gNB 70 shuts down the original cell (e.g., at the stop time) at the current location (e.g., as the cell may reappear in a different location).

Figure 4:
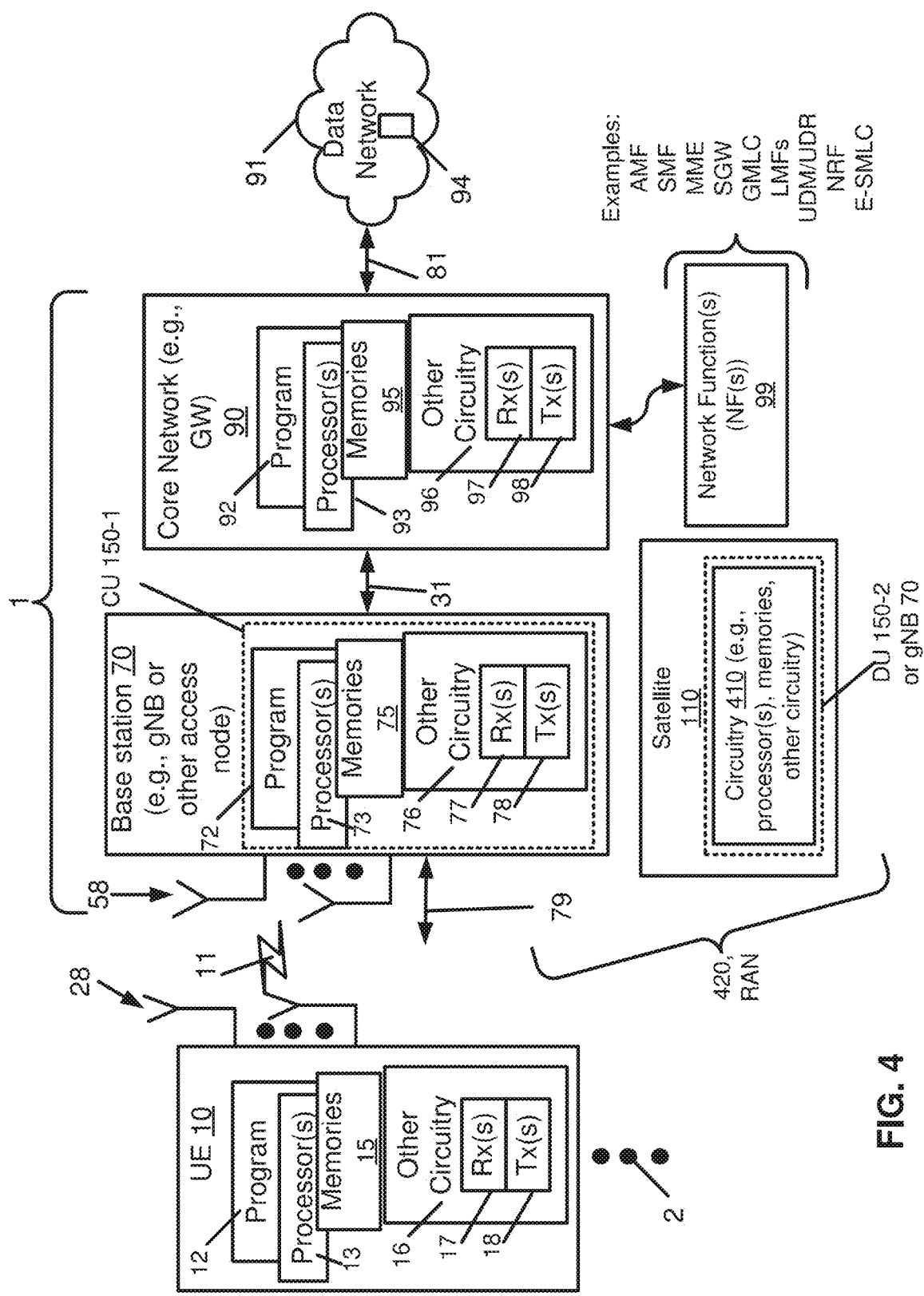
FIG. 4 is a block diagram of one possible and non-limiting exemplary system in which the exemplary embodiments may be practiced.

Turning to FIG. 4, this figure shows a block diagram of one possible and non-limiting example of a cellular network 1 that is connected to a user equipment (UE) 10. Multiple network elements are shown in the cellular network of FIG. 4: a base station 70; and a core network 90. In this example, the base station 70 is a gNB (e.g., or other access node providing access by the UE 10 to the core network 90). The GW is part of the core network 90 and therefore uses the reference number 90 (as 90-1) too.

As illustrated already in FIG. 1A, the satellite 110 may act as a "repeater", and form part of the cellular network 1 and in particular part of a RAN 420, which includes the gNB 70. The satellite 110 includes circuitry 410, including, e.g., processor(s), memories, and other circuitry as in the UE 10, gNB 70, and core network 90. In FIG. 1B, the gNB 70 is converted into two parts, the CU 150-1 (on the earth) and DU 150-2 (in a satellite 110), each of which has circuitry as per the corresponding dashed boxes. In FIG. 1C, the gNB 70 is moved to a corresponding satellite 110.

In FIG. 4, a user equipment (UE) 10 is in wireless communication via radio link 11 with the base station 70 of the cellular network 1. A UE 10 is a wireless communication device, such as a mobile device, that is configured to access a cellular network. The UE 10 is illustrated with one or more antennas 28. The ellipses 2 indicate there could be multiple UEs 10 in wireless communication via radio links with the base station 70. The UE 10 includes one or more processors 13, one or more memories 15, and other circuitry 16. The other circuitry 16 includes one or more receivers (Rx(s)) 17 and one or more transmitters (Tx(s)) 18. A program 12 is used to cause the UE 10 to perform the operations described herein. For a UE 10, the other circuitry 16 could include circuitry such as for user interface elements (not shown) like a display.

The base station 70, as a network element of the cellular network 1, provides the UE 10 access to cellular network 1 and to the data network 91 via the core network 90 (e.g., via a user plane function (UPF) of the core network 90). The base station 70 is illustrated as having one or more antennas 58. In general, the base station 70 may be referred to as RAN node 70, although many will make reference to this as a gNB (gNode B, a base station for NR, new radio) instead. There are, however, many other examples of RAN nodes including an eNB (evolved Node B) or TRP (Transmission-Reception Point). The base station 70 includes one or more processors 73, one or more memories 75, and other circuitry 76. The other circuitry 76 includes one or more receivers (Rx(s)) 77 and one or more transmitters (Tx(s)) 78. A program 72 is used to cause the base station 70 to perform the operations described herein.

It is noted that the base station 70 may instead be implemented via other wireless technologies, such as Wi-Fi (a wireless networking protocol that devices use to communicate without direct cable connections). In the case of Wi-Fi, the link 11 could be characterized as a wireless link.

Two or more base stations 70 communicate using, e.g., link(s) 79. The link(s) 79 may be wired or wireless or both and may implement, e.g., an Xn interface for 5G (fifth generation), an X2 interface for LTE (Long Term Evolution), or other suitable interface for other standards.

The cellular network 1 may include a core network 90, as a third illustrated element or elements, that may include core network functionality, and which provide connectivity via a link or links 81 with a data network 91, such as a telephone network and/or a data communications network (e.g., the Internet). The core network 90 includes one or more processors 93, one or more memories 95, and other circuitry 96. The other circuitry 96 includes one or more receivers (Rx(s)) 97 and one or more transmitters (Tx(s)) 98. A program 92 is used to cause the core network 90 to perform the operations described herein.

The core network 90 could be a 5GC (5G core network). The core network 90 can implement or comprise multiple network functions (NF(s)) 99, and the program 92 may comprise one or more of the NFs 99. A 5G core network may use hardware such as memory and processors and a virtualization layer. It could be a single standalone computing system, a distributed computing system, or a cloud computing system. The NFs 99, as network elements, of the core network could be containers or virtual machines running on the hardware of the computing system(s) making up the core network 90.

Core network functionality for 5G may include access and mobility management functionality that is provided by a network function 99 such as an access and mobility management function (AMF(s)), session management functionality that is provided by a network function such as a session management function (SMF). Core network functionality for access and mobility management in an LTE (Long Term Evolution) network may be provided by an MME (Mobility Management Entity) and/or SGW (Serving Gateway) functionality, which routes data to the data network. Many others are possible, as illustrated by the examples in FIG. 4: AMF; SMF; MME; SGW; GMLC (Gateway Mobile Location Center); LMFs (Location Management Functions); UDM (Unified Data Management)/UDR (Unified Data Repository); NRF (Network Repository Function); and/or E-SMLC (Evolved Serving Mobile Location Center). These are merely exemplary core network functionality that may be provided by the core network 90, and note that both 5G and LTE core network functionality might be provided by the core network 90. The RAN node 70 is coupled via a backhaul link 31 to the core network 90. The RAN node 70 and the core network 90 may include an NG (Next Generation) interface for 5G, or an SI interface for LTE, or other suitable interface for other radio access technologies for communicating via the backhaul link 31.

In the data network 91, there is a computer-readable medium 94. The computer-readable medium 94 contains instructions that, when downloaded and installed into the memories 15, 75, or 95 of the corresponding UE 10, base station 70, and/or core network element(s) 90, and executed by processor(s) 13, 73, or 93, cause the respective device to perform corresponding actions described herein. The computer-readable medium 94 may be implemented in other forms, such as via a compact disc or memory stick.

The programs 12, 72, and 92 contain instructions stored by corresponding one or more memories 15, 75, or 95. These instructions, when executed by the corresponding one or more processors 13, 73, or 93, cause the corresponding apparatus 10, 70, or 90, to perform the operations described herein. The computer readable memories 15, 75, or 95 may be of any type suitable to the local technical environment and may be implemented using any suitable data storage technology, such as semiconductor-based memory devices, flash memory, firmware, magnetic memory devices and systems, optical memory devices and systems, fixed memory and removable memory. The computer readable memories 15, 75, and 95 may be means for performing storage functions. The processors 13, 73, and 93, may be of any type suitable to the local technical environment, and may include one or more of general-purpose computers, special purpose computers, microprocessors, digital signal processors (DSPs) and processors based on a multi-core processor architecture, as non-limiting examples. The processors 13, 73, and 93 may be means for causing their respective apparatus to perform functions, such as those described herein.

The receivers 17, 77, and 97, and the transmitters 18, 78, and 98 may implement wired or wireless interfaces. The receivers and transmitters may be grouped together as transceivers.

The cellular network 1 may implement network virtualization, which is the process of combining hardware and software network resources and network functionality into a single, software-based administrative entity, a virtual network. Network virtualization involves platform virtualization, often combined with resource virtualization. Network virtualization is categorized as either external, combining many networks, or parts of networks, into a virtual unit, or internal, providing network-like functionality to software containers on a single system. Note that the virtualized entities (such as network functions 99) that result from the network virtualization are still implemented, at some level, using hardware such as processors 73 and/or 93 and memories 75 and/or 95, and also such virtualized entities create technical effects.

In general, the various embodiments of the user equipment 10 can include, but are not limited to, cellular telephones (such as smart phones, mobile phones, cellular phones, voice over Internet Protocol (IP) (VOIP) phones, and/or wireless local loop phones), tablets, portable computers, vehicles or vehicle-mounted devices for, e.g., wireless V2X (vehicle-to-everything) communication, image capture devices such as digital cameras, gaming devices, music storage and playback appliances, Internet appliances (including Internet of Things, IoT, devices), IoT devices with sensors and/or actuators for, e.g., automation applications, as well as portable units or terminals that incorporate combinations of such functions, laptop-embedded equipment (LEE), laptop-mounted equipment (LME), Universal Serial Bus (USB) dongles, smart devices, wireless customer-premises equipment (CPE), an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. That is, the UE 10 could be any end device that may be capable of wireless communication. By way of example rather than limitation, the UE may also be referred to as a communication device, terminal device (MT), a Subscriber Station (SS), a Portable Subscriber Station, a Mobile Station (MS), or an Access Terminal (AT).

Without in any way limiting the scope, interpretation, or application of the claims appearing below, a technical effect and/or advantage of one or more of the example embodiments disclosed herein is avoidance of an L3 handover with the associated signaling and delays. Another technical effect and/or advantage of one or more of the example embodiments disclosed herein is saving RACH (random access channel) resources as the RACH is not being used.

The following are additional examples.

Example 1. A method, comprising: receiving, by a user equipment connected using a current cell served by a first satellite to a base station, information from the base station comprising assistance information for a cell switch from the current cell to a cell served by a second satellite, wherein the information is received before a stop time indicating when the current cell will stop serving the user equipment; and performing, by the user equipment, the cell switch from the current cell to the cell served by the second satellite using at least the assistance information to find one or more cell synchronization blocks for the served by the second satellite.

Example 2. The method according to example 1, wherein: the assistance information comprises one or more time offsets relative to existing cell timing for the current cell; and performing the cell switch uses at least the one or more time offsets to find the one or more cell synchronization blocks for the cell served by the second satellite.

Example 3. The method according to any of examples 1 or 2, wherein: the assistance information comprises a frequency offset of one or more cell synchronization blocks to use for detection, measurement, and evaluation of the one or more cell synchronization blocks of the cell served by the second satellite; and performing the cell switch uses at least the frequency offset to find the one or more cell synchronization blocks for the cell served by the second satellite.

Example 4. The method according to example 3, wherein: the assistance information comprises an additional value of a frequency offset, wherein a first frequency offset is an offset to a first subcarrier of one or more cell synchronization blocks used by the current cell, and the additional value of the frequency offset is from the first frequency offset to a first subcarrier of the one or more cell synchronization blocks to use for synchronization for the cell served by the second satellite; and performing the cell switch uses at least the first frequency offset and the additional value to find the one or more cell synchronization blocks for the synchronization for the cell served by the second satellite.

Example 5. The method according to example 1, wherein: the assistance information comprises a different set of locations in time and frequency for the one or more cell synchronization blocks that is provided corresponding to the cell served by the second satellite, wherein the different set of locations is different from a set of locations in time and frequency for one or more cell synchronization blocks corresponding to the current cell; and performing the cell switch uses at least the different set of locations to find the one or more cell synchronization blocks for the cell served by the second satellite.

Example 6. The method according to any of examples 1 to 5, wherein: the assistance information comprises a time interval for the user equipment to perform a search for a re-synchronization attempt to the cell served by the second satellite; and performing the cell switch uses at least the time interval to find the one or more cell synchronization blocks for the cell served by the second satellite.

Example 7. The method according to any of examples 1 to 6, wherein: the assistance information comprises ephemeris information corresponding to the second satellite to apply when attempting a re-synchronization to the cell served by the second satellite; and performing the cell switch uses at least the ephemeris information to find the one or more cell synchronization blocks for the cell served by the second satellite.

Example 8. The method according to any of examples 1 to 7, wherein the cell switch uses one of a change in physical cell identification between the current cell and the cell served by the second satellite, or a same physical cell identification for both the current cell and the cell served by the second satellite.

Example 9. The method according to any of examples 1 to 8, wherein the one or more cell synchronization blocks comprise corresponding one or more synchronization signal blocks comprising both search signals and physical broadcast channels.

Example 10. The method according to any of examples 1 to 9, wherein both the current cell and the cell served by the second satellite cover a same geographical area.

Example 11. The method according to any of examples 1 to 10, wherein the cell switch comprises a soft cell switch where there is overlapping satellite coverage at least at a switching time.

Example 12. A method, comprising: sending, by a base station to a user equipment connected using a current cell served by a first satellite to the base station, information from the base station comprising assistance information for a cell switch from the current cell to a cell served by a second satellite; and shutting down, by the base station, the current cell at a stop time.

Example 13. The method according to example 12, further comprising, before the shutting down, sending one or more cell synchronization blocks in the cell served by a second satellite according to the assistance information for the cell switch.

Example 14. The method according to example 12, further comprising, before the shutting down, communicating with an other base station so the other base station sends one or more cell synchronization blocks according to the assistance information for the cell switch.

Example 15. The method according to any of examples 12 to 14, wherein: the assistance information comprises one or more time offsets relative to existing cell timing for the current cell.

Example 16. The method according to any of examples 12 to 15, wherein: the assistance information comprises a frequency offset of one or more cell synchronization blocks to use for detection, measurement, and evaluation of the one or more cell synchronization blocks of the cell served by the second satellite.

Example 17. The method according to example 16, wherein: the assistance information comprises an additional value of a frequency offset, wherein a first frequency offset is an offset to a first subcarrier of one or more cell synchronization blocks used by the current cell, and the additional value of the frequency offset is from the first frequency offset to a first subcarrier of the one or more cell synchronization blocks to use for synchronization for the cell served by the second satellite.

Example 18. The method according to any of examples 12 to 14, wherein: the assistance information comprises a different set of locations in time and frequency for the one or more cell synchronization blocks that is provided corresponding to the cell served by the second satellite, wherein the different set of locations is different from a set of locations in time and frequency for one or more cell synchronization blocks corresponding to the current cell.

Example 19. The method according to any of examples 12 to 18, wherein: the assistance information comprises a time interval for the user equipment to perform a search for a re-synchronization attempt to the cell served by the second satellite.

Example 20. The method according to any of examples 12 to 19, wherein: the assistance information comprises ephemeris information corresponding to the second satellite to apply when attempting a re-synchronization to the cell served by the second satellite.

Example 21. The method according to any of examples 12 to 20, wherein the cell switch uses one of a change in physical cell identification between the current cell and the cell served by the second satellite, or a same physical cell identification for both the current cell and the cell served by the second satellite.

Example 22. The method according to any of examples 12 to 21, wherein the one or more cell synchronization blocks comprise corresponding one or more synchronization signal blocks comprising both search signals and physical broadcast channels.

Example 23. The method according to any of examples 12 to 22, wherein both the current cell and the cell served by the second satellite cover a same geographical area.

Example 24. The method according to any of examples 12 to 23, wherein the cell switch comprises a soft cell switch where there is overlapping satellite coverage at least at a switching time.

Example 25. A computer program, comprising instructions for performing the methods of any of examples 1 to 11, when the computer program is run on an apparatus.

Example 26. The computer program according to example 25, wherein the computer program is a computer program product comprising a computer-readable medium bearing instructions embodied therein for use with the apparatus.

Example 27. The computer program according to example 25, wherein the computer program is directly loadable into an internal memory of the apparatus.

Example 28. An apparatus comprising means for performing: receiving, by a user equipment connected using a current cell served by a first satellite to a base station, information from the base station comprising assistance information for a cell switch from the current cell to a cell served by a second satellite, wherein the information is received before a stop time indicating when the current cell will stop serving the user equipment; and performing, by the user equipment, the cell switch from the current cell to the cell served by the second satellite using at least the assistance information to find one or more cell synchronization blocks for the served by the second satellite.

Example 29. The apparatus according to example 28, wherein: the assistance information comprises one or more time offsets relative to existing cell timing for the current cell; and performing the cell switch uses at least the one or more time offsets to find the one or more cell synchronization blocks for the cell served by the second satellite.

Example 30. The apparatus according to any of examples 28 or 29, wherein: the assistance information comprises a frequency offset of one or more cell synchronization blocks to use for detection, measurement, and evaluation of the one or more cell synchronization blocks of the cell served by the second satellite; and performing the cell switch uses at least the frequency offset to find the one or more cell synchronization blocks for the cell served by the second satellite.

Example 31. The apparatus according to example 30, wherein: the assistance information comprises an additional value of a frequency offset, wherein a first frequency offset is an offset to a first subcarrier of one or more cell synchronization blocks used by the current cell, and the additional value of the frequency offset is from the first frequency offset to a first subcarrier of the one or more cell synchronization blocks to use for synchronization for the cell served by the second satellite; and performing the cell switch uses at least the first frequency offset and the additional value to find the one or more cell synchronization blocks for the synchronization for the cell served by the second satellite.

Example 32. The apparatus according to example 28, wherein: the assistance information comprises a different set of locations in time and frequency for the one or more cell synchronization blocks that is provided corresponding to the cell served by the second satellite, wherein the different set of locations is different from a set of locations in time and frequency for one or more cell synchronization blocks corresponding to the current cell; and performing the cell switch uses at least the different set of locations to find the one or more cell synchronization blocks for the cell served by the second satellite.

Example 33. The apparatus according to any of examples 28 to 32, wherein: the assistance information comprises a time interval for the user equipment to perform a search for a re-synchronization attempt to the cell served by the second satellite; and performing the cell switch uses at least the time interval to find the one or more cell synchronization blocks for the cell served by the second satellite.

Example 34. The apparatus according to any of examples 28 to 33, wherein: the assistance information comprises ephemeris information corresponding to the second satellite to apply when attempting a re-synchronization to the cell served by the second satellite; and performing the cell switch uses at least the ephemeris information to find the one or more cell synchronization blocks for the cell served by the second satellite.

Example 35. The apparatus according to any of examples 28 to 34, wherein the cell switch uses one of a change in physical cell identification between the current cell and the cell served by the second satellite, or a same physical cell identification for both the current cell and the cell served by the second satellite.

Example 36. The apparatus according to any of examples 28 to 35, wherein the one or more cell synchronization blocks comprise corresponding one or more synchronization signal blocks comprising both search signals and physical broadcast channels.

Example 37. The apparatus according to any of examples 28 to 36, wherein both the current cell and the cell served by the second satellite cover a same geographical area.

Example 38. The apparatus according to any of examples 28 to 37, wherein the cell switch comprises a soft cell switch where there is overlapping satellite coverage at least at a switching time.

Example 39. An apparatus comprising means for performing: sending, by a base station to a user equipment connected using a current cell served by a first satellite to the base station, information from the base station comprising assistance information for a cell switch from the current cell to a cell served by a second satellite; and shutting down, by the base station, the current cell at a current location at a stop time.

Example 40. The apparatus according to example 39, wherein the means are further configured to perform: before the shutting down, sending one or more cell synchronization blocks in the cell served by a second satellite according to the assistance information for the cell switch.

Example 41. The apparatus according to example 39, wherein the means are further configured to perform: before the shutting down, communicating with an other base station so the other base station sends one or more cell synchronization blocks according to the assistance information for the cell switch.

Example 42. The apparatus according to any of examples 39 to 41, wherein: the assistance information comprises one or more time offsets relative to existing cell timing for the current cell.

Example 43. The apparatus according to any of examples 39 to 42, wherein: the assistance information comprises a frequency offset of one or more cell synchronization blocks to use for detection, measurement, and evaluation of the one or more cell synchronization blocks of the cell served by the second satellite.

Example 44. The apparatus according to example 43, wherein: the assistance information comprises an additional value of a frequency offset, wherein a first frequency offset is an offset to a first subcarrier of one or more cell synchronization blocks used by the current cell, and the additional value of the frequency offset is from the first frequency offset to a first subcarrier of the one or more cell synchronization blocks to use for synchronization for the cell served by the second satellite.

Example 45. The apparatus according to any of examples 39 to 41, wherein: the assistance information comprises a different set of locations in time and frequency for the one or more cell synchronization blocks that is provided corresponding to the cell served by the second satellite, wherein the different set of locations is different from a set of locations in time and frequency for one or more cell synchronization blocks corresponding to the current cell.

Example 46. The apparatus according to any of examples 39 to 45, wherein: the assistance information comprises a time interval for the user equipment to perform a search for a re-synchronization attempt to the cell served by the second satellite.

Example 47. The apparatus according to any of examples 39 to 46, wherein: the assistance information comprises ephemeris information corresponding to the second satellite to apply when attempting a re-synchronization to the cell served by the second satellite.

Example 48. The apparatus according to any of examples 39 to 47, wherein the cell switch uses one of a change in physical cell identification between the current cell and the cell served by the second satellite, or a same physical cell identification for both the current cell and the cell served by the second satellite.

Example 49. The apparatus according to any of examples 39 to 48, wherein the one or more cell synchronization blocks comprise corresponding one or more synchronization signal blocks comprising both search signals and physical broadcast channels.

Example 50. The apparatus according to any of examples 39 to 49, wherein both the current cell and the cell served by the second satellite cover a same geographical area.

Example 51. The apparatus according to any of examples 39 to 50, wherein the cell switch comprises a soft cell switch where there is overlapping satellite coverage at least at a switching time.

Example 52. The apparatus of any preceding apparatus example, wherein the means comprises: at least one processor; and at least one memory storing instructions that, when executed by at least one processor, cause the performance of the apparatus.

Example 53. An apparatus, comprising: one or more processors; and one or more memories storing instructions that, when executed by the one or more processors, cause the apparatus at least to perform: receiving, by a user equipment connected using a current cell served by a first satellite to a base station, information from the base station comprising assistance information for a cell switch from the current cell to a cell served by a second satellite, wherein the information is received before a stop time indicating when the current cell will stop serving the user equipment; and performing, by the user equipment, the cell switch from the current cell to the cell served by the second satellite using at least the assistance information to find one or more cell synchronization blocks for the served by the second satellite.

Example 54. An apparatus, comprising: one or more processors; and one or more memories storing instructions that, when executed by the one or more processors, cause the apparatus at least to perform: sending, by a base station to a user equipment connected using a current cell served by a first satellite to the base station, information from the base station comprising assistance information for a cell switch from the current cell to a cell served by a second satellite; and shutting down, by the base station, the current cell at a current location at a stop time.

As used in this application, the term "circuitry" may refer to one or more or all of the following:

(a) hardware-only circuit implementations (such as implementations in only analog and/or digital circuitry) and (b) combinations of hardware circuits and software, such as (as applicable): (i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions) and (c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

Embodiments herein may be implemented in software (executed by one or more processors), hardware (e.g., an application specific integrated circuit), or a combination of software and hardware. In an example embodiment, the software (e.g., application logic, an instruction set) is maintained on any one of various conventional computer-readable media. In the context of this document, a "computer-readable medium" may be any media or means that can contain, store, communicate, propagate or transport the instructions for use by or in connection with an instruction execution system, apparatus, or device, such as a computer, with one example of a computer described and depicted, e.g., in FIG. 4. A computer-readable medium may comprise a computer-readable storage medium (e.g., memories 15, 75, and 95 or other device) that may be any media or means that can contain, store, and/or transport the instructions for use by or in connection with an instruction execution system, apparatus, or device, such as a computer. A computer-readable storage medium does not comprise propagating signals, and therefore may be considered to be non-transitory. The term "non-transitory", as used herein, is a limitation of the medium itself (i.e., tangible, not a signal) as opposed to a limitation on data storage persistency (e.g., RAM, random access memory, versus ROM, read-only memory).

If desired, the different functions discussed herein may be performed in a different order and/or concurrently with each other. Furthermore, if desired, one or more of the above-described functions may be optional or may be combined.

Although various aspects of the invention are set out in the independent claims, other aspects of the invention comprise other combinations of features from the described embodiments and/or the dependent claims with the features of the independent claims, and not solely the combinations explicitly set out in the claims.

It is also noted herein that while the above describes example embodiments of the invention, these descriptions should not be viewed in a limiting sense. Rather, there are several variations and modifications which may be made without departing from the scope of the present invention as defined in the appended claims.

The following abbreviations that may be found in the specification and/or the drawing figures are defined as follows:

3GPP third generation partnership project
5G fifth generation
6G sixth generation
AMF access and mobility management function
ARFCN absolute radio-frequency channel number
BS base station
BW bandwidth
CORESET control resource set
CN core network
CSI-RS channel state information-reference signal
CU central unit
Dl downlink (from network to UE)
DU distributed unit
EFC Earth fixed cell
E-SMLC evolved serving mobile location center
GMLC Gateway Mobile Location Center
GW gateway
eNB (or eNodeB) evolved Node B (e.g., an LTE base station)
gNB (or gNodeB) base station for 5G/NR
ID identification
IE information element
I/F interface
FR1 frequency range 1
FR2 frequency range 2
L3 layer 3
LMF Location Management Function
LS Liaison Statement
LTE long term evolution
MME mobility management entity
NF network function
ng or NG next generation
NR new radio
NRF Network Repository Function
NTN non-terrestrial network
N/W or NW network
OFDM orthogonal frequency division multiplexing
Opt option
PBCH Physical Broadcast Channel
PCI physical cell ID
PSS Primary synchronization signal
PRB physical resource block
PUCCH physical uplink control channel
RAN radio access network
RAN2, RAN3 different TSGs in front of 3GpP
Rel release
RLF radio link failure
Rx receiver
SGW serving gateway
SMF session management function
SSB synchronization signal block
SS/PBCH synchronization signal/physical broadcast channel
SSS Secondary synchronization signal
synch synchronize
TN terrestrial network
TRP transmission-reception point
TSG technical specification group
Tx transmitter
UDM unified data management
UDR unified data repository
UE user equipment (e.g., a wireless, typically mobile device)
UL uplink (from UE to network)
UPF user plane function

What is claimed is:

1. A method comprising:
receiving, from a base station via a cell served by a first satellite, information comprising assistance information for a satellite switch from the first satellite to a second satellite for the cell, wherein the information is received before a stop time indicating when the first satellite will stop serving a user equipment via the cell, and wherein the assistance information comprises one or more time offsets relative to timing of the cell served by the first satellite for finding one or more synchronization signal blocks (SSBs); and
performing the satellite switch from the first satellite to the second satellite using at least the assistance information to find the one or more SSBs for the cell served by the second satellite,
wherein the cell served by the first satellite has a same physical cell identity, PCI, as the cell served by the second satellite.

2. The method of claim 1, wherein the cell is served by the first satellite before the satellite switch and served by the second satellite after the satellite switch.

3. The method of claim 1, wherein the performing the satellite switch uses at least the one or more time offsets to find the one or more SSBs for the cell served by the second satellite.

4. The method of claim 1, wherein the assistance information comprises a frequency offset of one or more SSBs to use for detection, measurement, and evaluation of the one or more SSBs of the cell served by the second satellite.

5. The method of claim 4, wherein the performing the satellite switch comprises performing the satellite switch using at least the frequency offset to find the one or more SSBs for the cell served by the second satellite.

6. The method of claim 5, wherein the assistance information comprises an additional value of a frequency offset, wherein a first frequency offset is an offset to a first subcarrier of one or more SSBs used by the cell served by the first satellite, wherein the additional value of the frequency offset is from the first frequency offset to a first subcarrier of the one or more SSBs to use for synchronization for the cell served by the second satellite, and wherein the performing the satellite switch uses at least the first frequency offset and the additional value to find the one or more SSBs for the synchronization for the cell served by the second satellite.

7. The method of claim 1, wherein the assistance information comprises a different set of locations in time and frequency for the one or more SSBs that is provided corresponding to the cell served by the second satellite, wherein the different set of locations is different from a set of locations in time and frequency for one or more SSBs corresponding to the cell served by the first satellite, and wherein the performing the satellite switch uses at least the different set of locations to find the one or more SSBs for the cell served by the second satellite.

8. The method of claim 1, wherein the assistance information comprises a time interval for the user equipment to perform a search for a re-synchronization attempt to the cell served by the second satellite, and wherein the performing the satellite switch uses at least the time interval to find the one or more SSBs for the cell served by the second satellite.

9. The method of claim 1, wherein the assistance information comprises ephemeris information corresponding to the second satellite to apply when attempting a re-synchronization to the cell served by the second satellite, and wherein the performing the satellite switch uses at least the ephemeris information to find the one or more SSBs for the cell served by the second satellite.

10. The method of claim 1, wherein the one or more SSBs comprise corresponding one or more synchronization signal blocks comprising both search signals and physical broadcast channels.

11. The method of claim 1, wherein both the cell served by the first satellite and the cell served by the second satellite cover a same geographical area.

12. The method of claim 1, wherein the satellite switch comprises a soft satellite switch where there is overlapping satellite coverage at least at a switching time.

13. A user equipment comprising:
one or more processors; and
one or more memories storing instructions that, when executed by the one or more processors, cause the user equipment to perform:
receiving, from a base station via a cell served by a first satellite, information comprising assistance information for a satellite switch from the first satellite to a second satellite for the cell, wherein the information is received before a stop time indicating when the first satellite will stop serving the user equipment via the cell, and wherein the assistance information comprises one or more time offsets relative to timing of the cell served by the first satellite for finding one or more synchronization signal blocks (SSBs); and
performing the satellite switch from the first satellite to the second satellite using at least the assistance information to find the one or more SSBs for the cell served by the second satellite,
wherein the cell served by the first satellite has a same physical cell identity, PCI, as the cell served by the second satellite.

14. The user equipment of claim 13, wherein the cell is served by the first satellite before the satellite switch and served by the second satellite after the satellite switch.

15. The user equipment of claim 13, wherein the performing the satellite switch uses at least the one or more time offsets to find the one or more SSBs for the cell served by the second satellite.

16. The user equipment of claim 13, wherein the assistance information comprises a frequency offset of one or more SSBs to use for detection, measurement, and evaluation of the one or more SSBs of the cell served by the second satellite, and wherein the performing the satellite switch uses at least the frequency offset to find the one or more SSBs for the cell served by the second satellite.

17. The user equipment of claim 16, wherein the assistance information comprises an additional value of a frequency offset, wherein a first frequency offset is an offset to a first subcarrier of one or more SSBs used by the cell served by the first satellite, wherein the additional value of the frequency offset is from the first frequency offset to a first subcarrier of the one or more SSBs to use for synchronization for the cell served by the second satellite, and wherein the performing the satellite switch uses at least the first frequency offset and the additional value to find the one or more SSBs for the synchronization for the cell served by the second satellite.

18. The user equipment of claim 13, wherein the assistance information comprises a different set of locations in time and frequency for the one or more SSBs that is provided corresponding to the cell served by the second satellite, wherein the different set of locations is different from a set of locations in time and frequency for one or more SSBs corresponding to the cell served by the first satellite, and wherein the performing the satellite switch uses at least the different set of locations to find the one or more SSBs for the cell served by the second satellite.

19. The user equipment of claim 13, wherein the assistance information comprises a time interval for the user equipment to perform a search for a re-synchronization attempt to the cell served by the second satellite, and wherein the performing the satellite switch uses at least the time interval to find the one or more SSBs for the cell served by the second satellite.

20. The user equipment of claim 13, wherein the assistance information comprises ephemeris information corresponding to the second satellite to apply when attempting a re-synchronization to the cell served by the second satellite, and wherein the performing the satellite switch uses at least the ephemeris information to find the one or more SSBs for the cell served by the second satellite.

21. The user equipment of claim 13, wherein the one or more SSBs comprise corresponding one or more synchronization signal blocks comprising both search signals and physical broadcast channels.

22. The user equipment of claim 13, wherein both the cell served by the first satellite and the cell served by the second satellite cover a same geographical area.

23. The user equipment of claim 13, wherein the satellite switch comprises a soft satellite switch where there is overlapping satellite coverage at least at a switching time.

24. A base station comprising:
one or more processors; and
one or more memories storing instructions that, when executed by the one or more processors, cause the base station to perform:
sending, to a user equipment connected using a cell served by a first satellite, information comprising assistance information for a satellite switch from the first satellite to a second satellite for the cell, wherein the information is sent before a stop time indicating when the first satellite will stop serving the user equipment via the cell, and wherein the assistance information comprises one or more time offsets relative to timing of the cell served by the first satellite for finding one or more synchronization signal blocks (SSBs) for the cell served by the second satellite; and
shutting down the cell served by the first satellite at a current location at the stop time,
wherein the cell served by the first satellite has a same physical cell identity, PCI, as the cell served by the second satellite.

25. The base station of claim 24, wherein the one or more SSBs comprise corresponding one or more synchronization signal blocks comprising both search signals and physical broadcast channels.

26. The base station of claim 24, wherein both the cell served by the first satellite and the cell served by the second satellite cover a same geographical area.

27. The base station of claim 24, wherein the cell is served by the first satellite before the satellite switch and served by the second satellite after the satellite switch.

28. The base station according to claim 24, wherein the base station is further caused to perform: before the shutting down, sending one or more SSBs in the cell served by the second satellite according to the assistance information for the satellite switch.

29. The base station according to claim 24, wherein the base station is further caused to perform: before the shutting down, communicating with another base station so the other base station sends one or more SSBs according to the assistance information for the satellite switch.

30. The base station according to claim 24, wherein the satellite switch comprises a soft satellite switch where there is overlapping satellite coverage at least at a switching time.

31. A method, comprising:
sending, to a user equipment connected using a cell served by a first satellite, information comprising assistance information for a satellite switch from the first satellite to a second satellite for the cell, wherein the information is sent before a stop time indicating when the first satellite will stop serving the user equipment via the cell, and wherein the assistance information comprises one or more time offsets relative to timing of the cell served by the first satellite for finding one or more synchronization signal blocks, SSBs, for the cell served by the second satellite; and
shutting down the cell served by the first satellite at a current location at the stop time,
wherein the cell served by the first satellite has a same physical cell identity, PCI, as the cell served by the second satellite.

* * * * *